United States Patent
Li

(12)
(10) Patent No.: US 6,346,342 B1
(45) Date of Patent: Feb. 12, 2002

(54) BATTERY HAVING PRESSURE RELIEF MECHANISM FORMED IN CONTAINER

(75) Inventor: Huaxin Li, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/443,573

(22) Filed: Nov. 19, 1999

(51) Int. Cl.⁷ .......................... H01M 2/12; B65D 51/16
(52) U.S. Cl. .............................. 429/56; 429/57; 429/82; 429/172; 220/367.1
(58) Field of Search ............................ 429/56, 55, 53, 429/57, 72, 59, 82, 186, 171, 172, 174, 185; 220/366.1, 367.1

(56) References Cited

U.S. PATENT DOCUMENTS

| | | | |
|---|---|---|---|
| 2,478,798 A | 8/1949 | Williams, Jr. | 136/178 |
| 2,479,798 A | 8/1949 | Williams, Jr. | 136/178 |
| 2,525,436 A | 10/1950 | Williams, Jr. | 136/108 |
| 4,010,044 A | 3/1977 | Schaumburg | 429/82 |
| 4,175,166 A | 11/1979 | Rosansky | 429/56 |
| 4,256,812 A | 3/1981 | Tamura et al. | 429/56 |
| 4,486,514 A | 12/1984 | Chaney, Jr. | 429/56 |
| 4,601,959 A | 7/1986 | Romero | 429/56 |
| 4,698,282 A | 10/1987 | Mantello | 429/56 |
| 4,702,976 A | 10/1987 | Bowsky et al. | 429/181 |
| 4,789,608 A | 12/1988 | Oswald | 429/56 |
| 4,803,136 A | 2/1989 | Bowsky et al. | 429/56 |
| 4,842,965 A * | 6/1989 | Urushiwara et al. | 429/56 |
| 5,197,622 A | 3/1993 | Anderson | 220/89.2 |
| 5,667,912 A | 9/1997 | Georgopoulos | 429/170 |
| 5,731,098 A * | 3/1998 | Suzuki | 429/53 |
| 5,821,008 A * | 10/1998 | Harada et al. | 429/56 |
| 6,060,192 A * | 5/2000 | Tucholski | 429/56 |

FOREIGN PATENT DOCUMENTS

| | | | |
|---|---|---|---|
| GB | 2334812 | 9/1999 | H01M/2/12 |
| JP | 1309253 | 12/1989 | H01M/2/12 |
| JP | 9161738 | 6/1997 | H01M/2/02 |
| JP | 11213978 | 8/1999 | H01M/2/12 |

* cited by examiner

*Primary Examiner*—Stephen Kalafut
*Assistant Examiner*—R Alejandro
(74) *Attorney, Agent, or Firm*—Russell H. Toye, Jr.; Robert W. Welsh

(57) ABSTRACT

An electrochemical cell having a container with a closed bottom end, an open top end, and side walls extending between the top and bottom ends has a pressure relief mechanism formed in the bottom end, and positive and negative electrodes disposed in the container. The pressure relief mechanism is a stress concentrator formed in the container for providing pressure relief to vent high pressure gases. The stress concentrator includes first and second crossing grooves and third and fourth arcuate grooves to provide for multiple stress concentration points which offers increased reliability of venting, reduced space required for the vent opening, and results in significant reduction of bulging in the closed bottom end of the container.

23 Claims, 4 Drawing Sheets

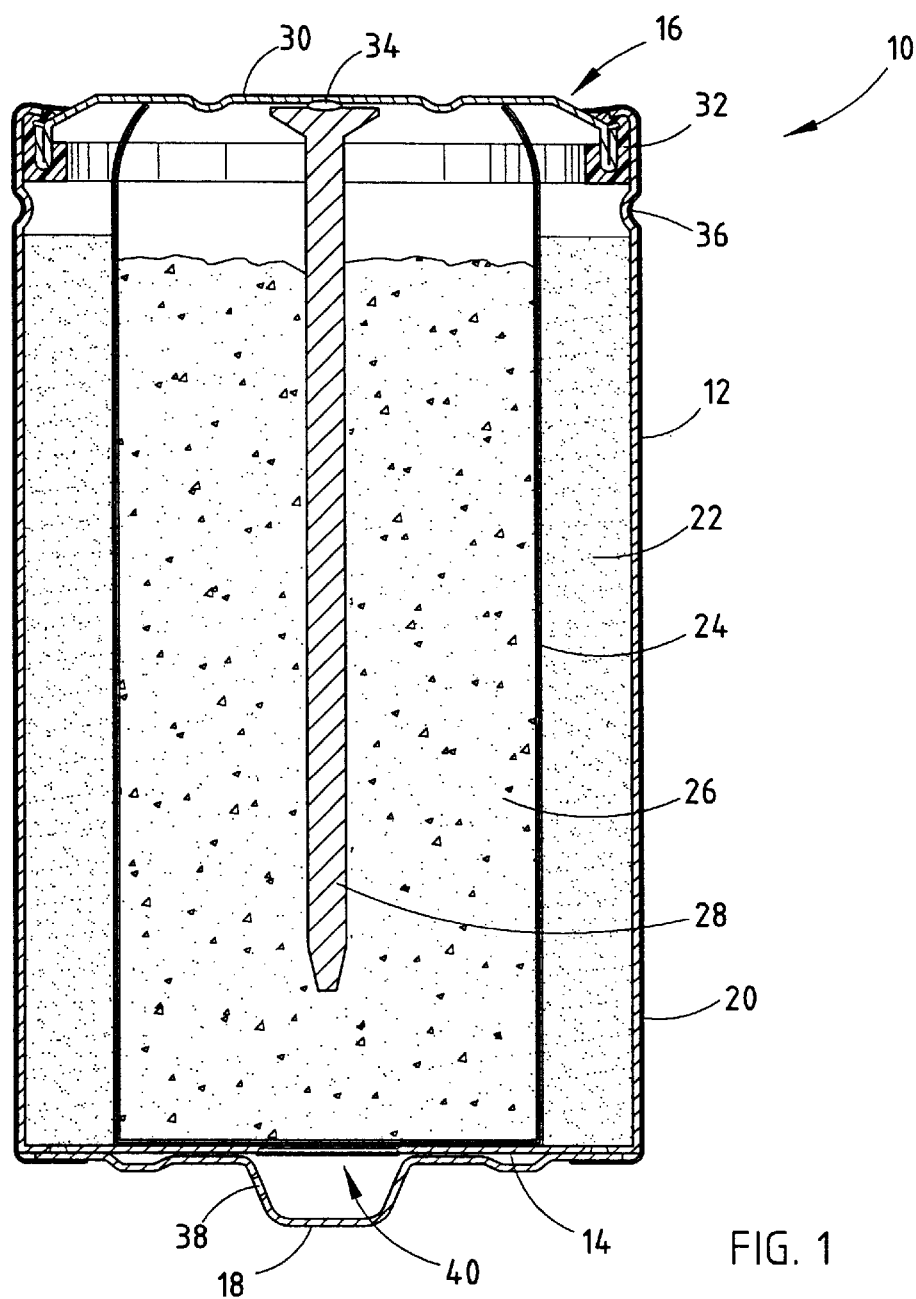
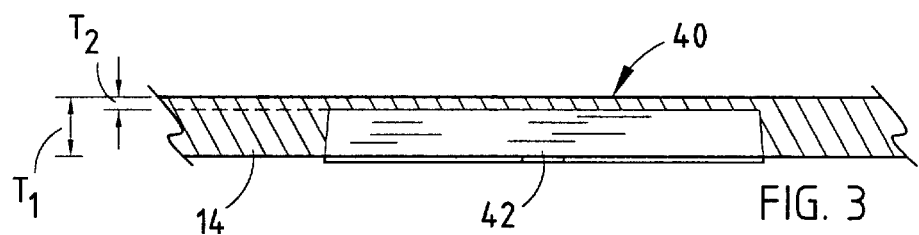

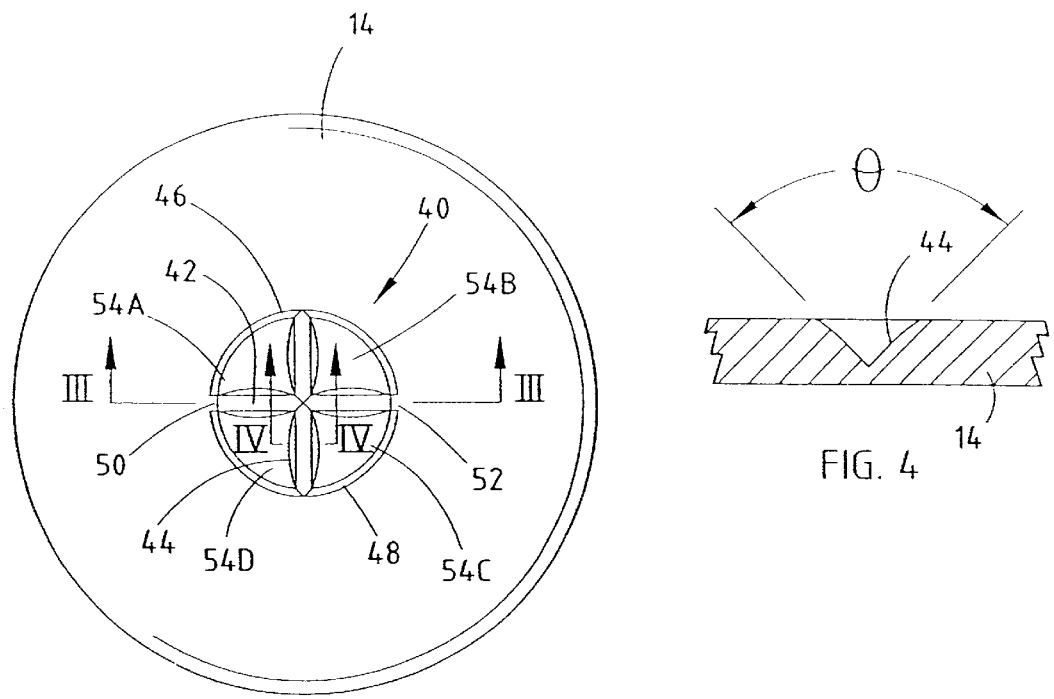
FIG. 2
FIG. 4
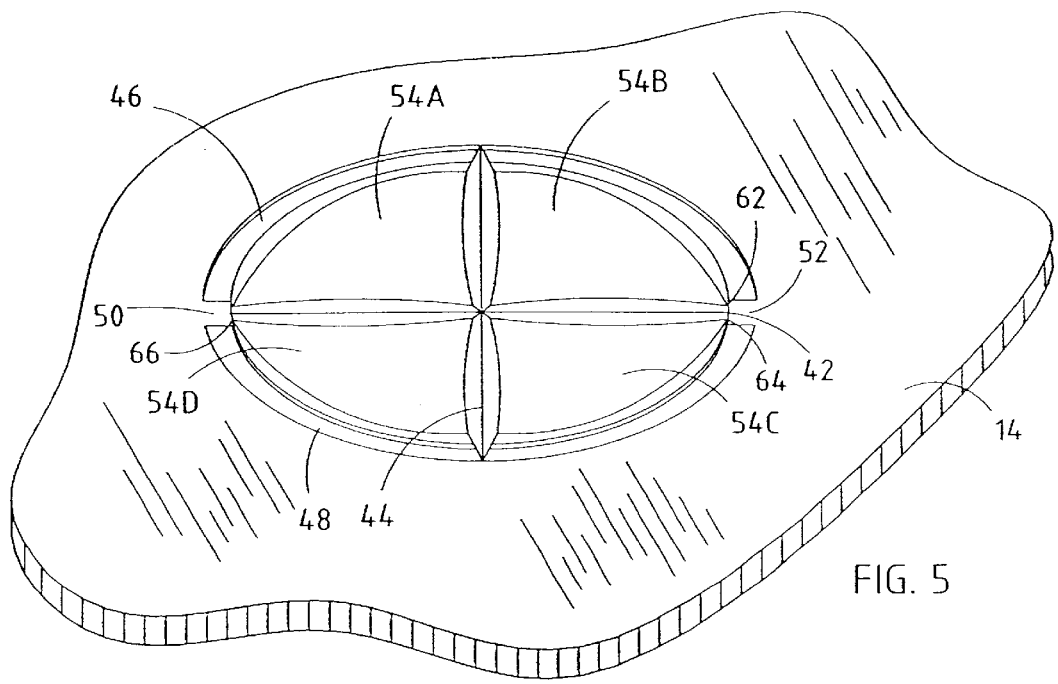
FIG. 5

BATTERY HAVING PRESSURE RELIEF MECHANISM FORMED IN CONTAINER

BACKGROUND OF THE INVENTION

The present invention generally relates to electrochemical cells, i.e., batteries, and, more particularly, to a battery having a pressure relief mechanism formed in the container for venting when exposed to excessive pressure.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. In bobbin-type cell constructions, the cathode is typically formed against the interior surface of the steel can, while the anode is generally centrally disposed in the can. Alternately, in jelly-roll cells, the anode and cathode are spirally wound. A separator is located between the anode and the cathode, and an alkaline electrolyte solution simultaneously contacts the anode, the cathode, and the separator. A conductive current collector is commonly inserted into the anode active material, and a collector and seal assembly, which includes a seal member, an inner metal cover, a current collector, and an outer cover, provides closure to the open end of the steel can to seal the active electrochemical materials in the sealed volume of the can.

Cylindrical alkaline electrochemical cells are commonly sealed closed by placing an annular nylon seal in the open end of the steel can and crimping the upper end of the can radially inwardly and over the outer periphery of the seal to compress the seal against the can. However, electrochemical cells commonly employ electrochemically active materials, such as zinc, which generate hydrogen gas during storage and sometimes during or following service use. When the battery can is sealed closed, excessive build-up of high pressure gases within the sealed can may cause damage to the cell and/or the device in which the cell is employed.

One approach to avoiding a potentially excessive build-up of pressure in a cell has been to employ a resealable valve system that periodically releases excessive gas pressure from within the active cell volume. However, the continued periodic release of gas pressure may, in some situations, permit the release of electrolyte solution containing salts and other particulate matter, which may foul the resealable valve. In addition, resealable valve systems generally require additional costly components that are typically quite voluminous.

Other more widely acceptable approaches to venting excessive pressure have included the use of a vent formed in the annular nylon seal, which is intended to rupture upon experiencing an excessive pressure build-up within the cell. For example, U.S. Pat. No. 5,667,912 discloses a current collector assembly having a low profile seal with a thinned portion which is intended to shear when the internal pressure exceeds a predetermined pressure. The conventional ventable seals typically employ a circular thinned region formed in the annular nylon seal. However, the amount of space occupied by the annular seal and the corresponding current collector, inner metal cover, and outer cover, can be significant. The greater the space occupied by the seal and collector assembly, the less space that there is available within the cell for the electrochemically active materials. Consequently, a reduction in the amount of electrochemically active materials provided within the cell generally results in a shorter service life for the cell. It is therefore desirable to maximize the internal volume within an electrochemical cell that is available for the electrochemically active components.

SUMMARY OF THE INVENTION

The present invention improves the protective safeguards of an electrochemical cell with an enhanced pressure relief mechanism that allows for the use of a low profile seal assembly for sealing the open end of the cell container. To achieve this and other advantages, and in accordance with the purpose of the invention as embodied and described herein, the present invention provides for an electrochemical cell having conventional components of a container with a closed bottom end, an open top end and side walls extending between the top and bottom ends, and positive and negative electrodes disposed in the container, but also the container having a stress concentrator formed therein for providing pressure relief to vent high pressure gases. The stress concentrator includes first and second stress concentration grooves arranged to cross each other, and a third stress concentration groove having an arcuate configuration and arranged in relation to the first and second stress concentration grooves to define a vent section. The stress concentrator advantageously provides for multiple stress concentration points which offer increased reliability of venting, reduced space required for the vent opening, and which results in significant reduction of bulging in the closed bottom end of the container.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a longitudinal cross-sectional view of an electrochemical cell having a stress concentrator formed in the closed bottom end of the can according to the present invention;

FIG. 2 is a bottom plan view of the closed end of the cell can illustrating the stress concentrator formed therein;

FIG. 3 is an enlarged cross-sectional view taken through lines III—III in FIG. 2, which illustrates the stress concentrator;

FIG. 4 is an enlarged cross-sectional view taken through lines IV—IV in FIG. 2, which further illustrates the stress concentrator;

FIG. 5 is a partial enlarged view of the bottom end of the can illustrating the stress concentrator in a non-vented condition;

DETAILED DESCRIPTION OF THE PREFERRED EMBODIMENTS

Figure 6:
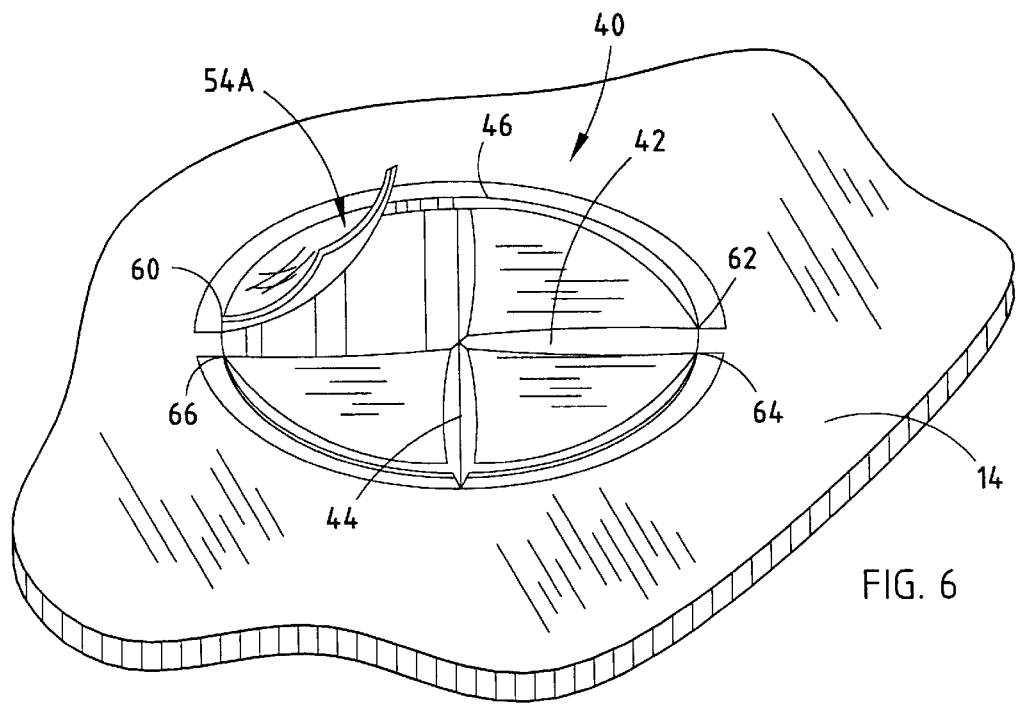
FIG. 6 is a partial enlarged view of the bottom end of the can illustrating the stress concentrator in one vented condition.

Referring to FIG. 1, a cylindrical alkaline electrochemical cell 10 is shown therein having a stress concentration pressure release mechanism formed in the cell can according to the present invention. Electrochemical cell 10 includes a cylindrical steel can 12 having a closed bottom end 14, and an open top end 16 and side walls extending between the top and bottom ends. The closed bottom end of can 12 has a positive cover 18 welded or otherwise attached thereto and formed of plated steel, with a protruding nub at its center region, which forms the positive contact terminal of cell 10. Assembled to the open top end 16 of steel can 12 is a conductive cover 30 which forms the negative contact terminal of cell 10. A metalized, plastic film label 20 is formed about the exterior surface of steel can 12, except for the ends of steel can 12. Film label 20 is formed over the peripheral edge of the positive cover 18 and may extend partially onto the negative cover 30 as shown.

A cathode 22 is formed about the interior surface of steel can 12. Cathode 22 may be formed of a mixture of manganese dioxide, graphite, potassium hydroxide solution, and additives, according to one example. A separator 24, which may be formed of a non-woven fabric that prevents migration of any solid particles in the cell, is disposed about the interior surface of cathode 22. An anode 26 is disposed with an electrolyte inside the separator 24 and in contact with a current collector 28 which may include a brass nail having an elongated body and an enlarged head at one end. The anode may be formed of zinc powder, a gelling agent, and additives, according to one example. Accordingly, the cathode 22 is configured as the positive electrode, and the anode 26 is configured as the negative electrode. While a bobbin-type cell construction is shown, it should be appreciated that the cell 10 can otherwise be configured, such as a jelly-roll configuration.

The current collector 28 contacts the negative cover 30 which forms the negative contact terminal of cell 10. The negative cover 30 is preferably formed of plated steel, and may be held in contact with current collector 28 via weld 34 or pressurized contact. A ring-shaped nylon seal 32 having a J-shaped cross section is disposed in the open end of steel can 12 to provide a sealed closure between the can 12 and negative cover 30 to prevent leakage of electrochemically active cell materials contained in the steel can 12. The assembly of the seal 32 may include disposing the seal 32 in the open end of steel can 12 on top of a bead 36 formed radially inward on the side walls of can 12, or alternately in a flared opening, and crimping the upper end of can 12 inwardly and over the outer periphery of the seal 32 and negative cover 30 to compress seal 32 against bead 36. Therefore, the nylon seal 32 is compressed between the peripheral edge of negative cover 30 and upper end walls of steel can 12. It should also be appreciated that the negative cover 30 is electrically insulated from the steel can 12 by way of nylon seal 32.

According to the present invention, a stress concentration pressure relief mechanism 40 is formed in the closed bottom end 14 of steel can 12. The stress concentrator 40 includes a plurality of reduced thickness grooves that provide thinned sections which act as a pressure relief mechanism for venting high pressure gases when exposed to an excessive pressure differential. The stress concentrator 40 is designed to fracture along one or more of the reduced thickness grooves and offers a plurality of possible vented configurations when exposed to a predetermined pressure differential to release high pressure gas from within the sealed active volume of cell 10. As a result of forming the stress concentration pressure relief mechanism 40 in the closed end 14 of the steel can 12, complex and voluminous collector/seal assemblies may be replaced with assemblies that consume less volume and have fewer parts. Thus, a significant improvement in internal volume efficiency may be obtained.

Unlike conventional pressure relief mechanisms of the prior art, the stress concentration pressure relief mechanism 40 of the present invention is positioned beneath positive cover 18 so as to prevent the electrochemical materials from spraying directly outward from the battery 10 upon rupture. To allow for release of vented gas to the outside atmosphere, the positive cover 18 has one or more openings 38 formed in the side of its protruding nub. Also, if the battery 10 were used in series with another battery such that the end of the positive terminal of the battery 10 is pressed against the negative terminal of another battery, the provision of the positive cover 18 over pressure relief mechanism 40 allows mechanism 40 to bow outwardly under the positive protrusion and ultimately rupture. If positive cover 18 was not present during such circumstances, the contact between the two batteries may otherwise prevent the pressure relief mechanism 40 from rupturing. Further, if the positive cover 18 were not provided over pressure relief mechanism 40, the pressure relief mechanism 40 at the positive end of the battery 10 would be more susceptible to damage. Positive cover 18 also shields pressure relief mechanism 40 from the corrosive effects of the ambient environment and therefore reduces the possibility of premature venting and/or leakage. Thus, by forming the pressure relief mechanism 40 under the positive cover 18, the present invention overcomes problems associated with the prior art constructions, and thus represents a commercially feasibly pressure relief mechanism for a battery.

Due to the formation of a pressure relief mechanism in the bottom end 14 of the battery can 12, the need for a complex and voluminous collector/seal assembly is eliminated, and instead the open end 16 of the can 12 may be sealed using seal construction techniques that were not previously feasible due to the need to allow gases to escape through the pressure relief mechanism to the exterior of the battery. The example shown of the collector and seal assembly having a seal 32 with a J-shaped cross section and negative cover 30 is only one example of a low-profile seal assembly that may be employed on a battery having the pressure relief mechanism 40 of the present invention, as other seal assemblies may be employed.

Referring to FIGS. 2–5, the stress concentrator 40 is shown in greater detail. The stress concentration pressure relief mechanism 40 is provided by forming grooves in either the outer (as shown) and/or inner surfaces of the bottom end 14 of steel can 12. The stress concentration grooves may be formed by punching depressed grooves in the bottom end 14 of steel can 12, such as by a press punching process, to reconfigure the bottom end 14 of steel can 12. The stress concentrator 40 includes a first stress concentration groove 42 formed along the horizontal axis, and a second stress concentration groove 44 formed along the vertical axis. The first and second grooves 42 and 44 cross each other, and are preferably orthogonal to each other in the shape of a cruciform as shown oriented in FIG. 2. In addition, a third stress concentration groove 46 is formed in a substantially semi-circular pattern and terminates adjacent to opposite ends of horizontal groove 42. Similarly, a fourth stress concentration groove 48 is formed symmetric with respect to the third groove 46 and is shaped in a substantially semi-circular pattern and terminates adjacent to the opposite ends of horizontal groove 42. The third and fourth arcuate grooves 46 and 48 are arranged so that groove 46 terminates near the upper end corners 60 and 62 of groove 42, while groove 48 terminates near the lower end corners 64 and 66 of groove 42.

The size of the areas circumscribed by the grooves 42, 44, 46, and 48 is preferably selected such that upon rupture due to excessive internal pressure within the cell 10, an area defined by certain grooves may pivot at a hinge and open within the positive protrusion of the positive cover 18 without interference from the positive cover 18. In general, the size of the areas defined by the grooves 42, 44, 46, and 48, as well as the selected depth of the grooves, depends upon the diameter of the can 12 and the pressure at which the pressure relief mechanism 40 is intended to rupture to release internally-generated gases.

The stress concentration grooves 42, 44, 46, and 48 provide a reduced thickness in the steel can 12 sufficient to shear and thereby fracture upon experiencing a predetermined pressure differential. As shown in FIG. 3, the bottom end 14 of steel can 12 has a thickness $T_1$, which may be equal to approximately 10 mils according to one example. In comparison, each groove of stress concentrator 40 may have a metal thickness $T_2$ of approximately 2 mils to achieve a predetermined venting pressure of about 1,000 psi for a AA-size cell. Accordingly, the groove 42 extends to a depth equal to the difference of $T_1$–$T_2$. With particular reference to FIG. 4, the cross section of groove 44 is shown configured as a generally V-shaped (i.e., wedge-shaped) groove which provides a fracture line extending vertically down from the apex of the groove 44. Each of grooves 42, 46, and 48 is preferably formed to be identical to the cross section of groove 44. The V-shaped groove 44 has an angle θ preferably in the range of 10 degrees to 100 degrees.

As is particularly shown in FIG. 5, the stress concentration grooves 42, 44, 46, and 48 of stress concentration pressure relief mechanism 40 substantially surround and defined four vent quadrants 54A–54D. Vent quadrants 54A and 54B are generally defined about the perimeter by stress concentration grooves 42, 44, and 46, whereas vent quadrants 54C and 54D are generally defined about the perimeter by stress concentration grooves 42, 44, and 48. Located at opposite ends of groove 42 are sections 50 and 52 which have non-reduced can thickness and serve as hangers to hinge onto the fractured vent quadrant(s). The corners 60, 62, 64, and 66 of sections 50 and 52 serve as pivot points about which one or more of the vent quadrants 54A–54D pivot during a venting occurrence.

Referring to FIG. 6, the stress concentrator 40 is shown in a vented state, according to one configuration. The stress concentrator 40 may vent in any one of a number of vent states by shearing along one or more of the stress concentration grooves 42, 44, 46, and 48 as explained herein. As shown in FIG. 6, vent quadrant 54A is shown fractured along grooves 42, 44, and 46, such that vent quadrant 54A hinges about hinge point 60. Hinge point 60 has a non-reduced thickness so that it is stronger than the stress concentration grooves and therefore serves to hold the fractured vent quadrant 54A during and after the venting occurrence.

Figure 7:
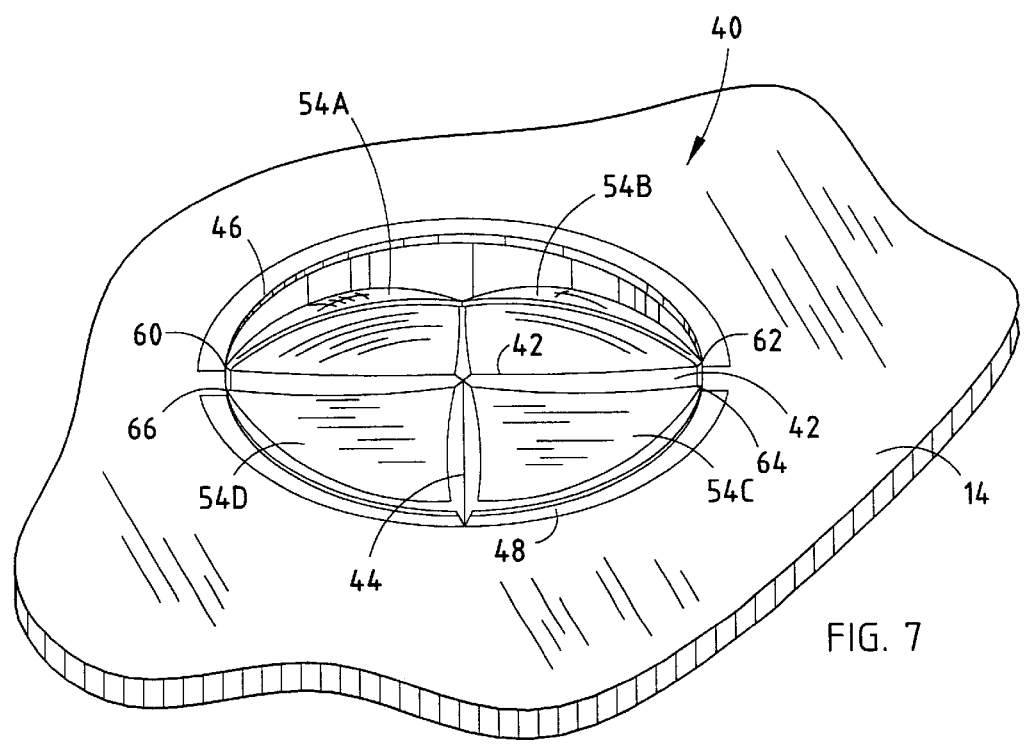
FIG. 7 is a partial enlarged view of the bottom end of the can illustrating the stress concentrator in another vented condition.

Referring to FIG. 7, the stress concentrator 40 is shown during a venting occurrence, according to a second configuration. In this configuration, vent quadrants 54A and 54B are shown sheared and fractured together along groove 46, such that vent quadrants 54A and 54B, as a single member, are hinged at corners 60 and 62. In addition, vent quadrants 54A and 54B may be further hinged along stress concentration groove 42 so as to enable pivoting thereon. It should further be appreciated that vent quadrants 54B and 54C may likewise each fracture along the corresponding boundaries formed by stress concentration grooves 42, 44, 46, and 48 to pivot about corresponding hinge points 62, 64, and 66, respectively to create the vent opening.

Additionally, it should be appreciated that vent quadrants 54C and 54D may likewise shear and fracture along groove 48 and pivot about hinge corners 64 and 66, and may further pivot about stress concentration groove 42. It is also possible that either of the combinations of vent quadrants 54A and 54D or 54B and 54C may shear about grooves 46 and 48 so as to pivot about stress concentration groove 44. In all, the stress concentrator 40 of the present invention provides several potential vent configurations.

Figures 8, 9:
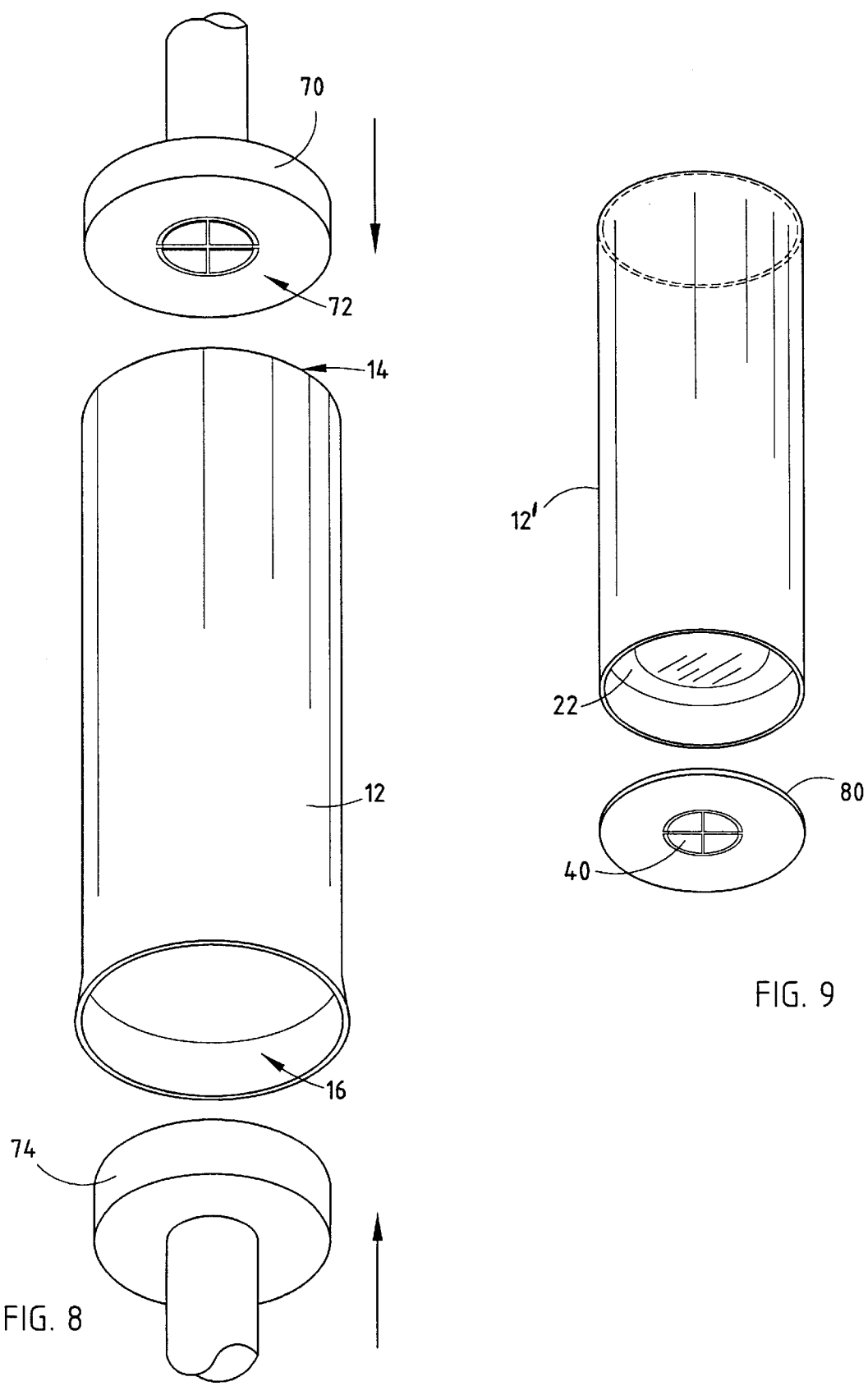
FIG. 8 is an assembly view illustrating formation of the stress concentrator in the bottom end of the can.
FIG. 9 is a n exploded view of a partially assembled electrochemical cell having a plug containing the stress concentrator according to another embodiment.

Turning to FIG. 8, the formation of the shear concentrator pressure release mechanism 40 is illustrated according to one example. Steel can 10 is positioned in relation to a press actuated punch 70 that has a generally planar surface with outwardly extending protrusions 72 which form the pattern of the stress concentration grooves. A support rod 74 having a generally flat rounded top is inserted into the open end 16 of can 12 to support the inside surface of the closed bottom end 14. With the support rod 74 fully inserted in can 10, the press punch 70 is actuated downwardly against the outside surface of the bottom end 14 of steel can 10 with sufficient force so that protrusions 72 forcefully engage and form stress concentration grooves 42, 44, 46, and 48. Once the formation of the stress concentrator 40 is complete, support rod 74 and press punch 70 are removed, and steel can 10 is ready for cell assembly. While a press punch process is shown for forming a V-shaped groove type stress concentrator 40, it should be appreciated that other stress concentration formation techniques and cross section shapes of the grooves could be employed, without departing from the spirit of the present invention.

The assembly of the electrochemical cell 10 preferably includes forming the cathode 22 using a cathode ring molding technique, which is less likely to adversely affect the stress concentrator 40 than impact molding techniques. However, it should be appreciated that cathode impact molding techniques could be employed. Once the cathode 22 is formed in steel can 12, the separator 24, the anode 26, and electrolyte solution are disposed in the container, the collector and seal assembly made up of current collector 28, seal 32, and negative cover 30 are disposed in the open end 16 of the can 12, and the can 12 is crimped closed to seal the electrochemical materials within the cell.

Referring to FIG. 9, an alternate embodiment of the steel can is shown employing a cylindrical steel can 12' having two open ends and a separate steel plug 80. Plug 80 has the stress concentrator 40 formed on the bottom and/or top surface thereof. The stress concentrator 40 may be formed and configured as described hereinabove. The steel plug 80 is formed separate from can 12' to include the stress concentrator 40 and thereafter is welded to one of the open ends of steel can 12' to form a closed bottom end. It should be appreciated that by forming the stress concentrator 40 on a separate plug 80, the cathode 22 may be inserted into the cylindrical can 12' prior to welding steel plug 80 to steel can 12' so that the cathode formation and assembly does not adversely affect the stress concentrator 40.

Accordingly, the stress concentrator pressure release mechanism 40 of the present invention provides for a reliable vent mechanism for releasing high pressure gases during a venting occurrence of the cell 10. The stress concentrator 40 is formed in the steel can 12 which allows for the use of a low profile seal assembly for sealing the open end of the cell can, and results in a significant reduction of bulging in the closed bottom end of the can 12.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A battery comprising:
   a container having a closed bottom end, an open top end and side walls extending between the top and bottom ends;
   a positive electrode disposed in said container;
   a negative electrode disposed in said container; and
   a pressure relief mechanism formed in said container for releasing internal pressure from within said container when the internal pressure becomes excessive, said pressure relief mechanism including a first stress concentration groove crossing a second stress concentration groove, and a third stress concentration groove having an arcuate configuration and arranged in relation to said first and second stress concentration grooves to define a vent section.

2. The battery as defined in claim 1, wherein said pressure relief mechanism is formed in the closed end of said container.

3. The battery as defined in claim 2 further comprising a cover positioned on the closed end of said container and extending over said pressure relief mechanism.

4. The battery as defined in claim 1 further comprising a seal assembly assembled to close the open end of the container.

5. The battery as defined in claim 1, wherein said third stress concentration groove has a substantially semi-circular configuration.

6. The battery as defined in claim 1, wherein said first and second stress concentration grooves are substantially orthogonal to one another.

7. The battery as defined in claim 1, wherein said battery further comprises a fourth stress concentration groove having an arcuate configuration and arranged in relation with said first and second stress concentration grooves to define another vent section.

8. The battery as defined in claim 1, wherein said pressure relief mechanism has multiple stress concentration points.

9. The battery as defined in claim 1, wherein said vent section has a hinge formed between said first and third grooves.

10. The battery as defined in claim 1, wherein said third stress concentration groove has a reduced thickness compared to the adjacent can bottom.

11. A battery comprising:
    a container having a closed bottom end, an open top end and side walls extending between the top and bottom ends;
    a positive electrode disposed in said container;
    a negative electrode disposed in said container;
    a pressure relief mechanism formed in the closed end of said container for releasing internal pressure from within said container when the internal pressure becomes excessive, said pressure relief mechanism including a first stress concentration groove crossing a second stress concentration groove, and third and fourth stress concentration grooves each having an arcuate configuration and arranged in relation to said first and second stress concentration grooves to define multiple vent sections; and
    a cover positioned on the closed end and extending over said pressure relief mechanism and spaced therefrom.

12. The battery as defined in claim 11 further comprising a seal assembly assembled to close the open end of the container.

13. The battery as defined in claim 11, wherein said first and second stress concentration grooves are substantially orthogonal to one another.

14. The battery as defined in claim 11, wherein said battery further comprises a first hinge between said first and third grooves and a second hinge between said first and fourth stress concentration grooves.

15. The battery as defined in claim 11, wherein said third and fourth grooves are substantially semi-circular.

16. The battery as defined in claim 11, wherein said third stress concentration groove has a reduced thickness compared to the adjacent can bottom.

17. A battery container for containing electrochemically active materials including positive and negative electrodes and electrolyte, said battery container comprising:
    a closed bottom end;
    an open top end; and
    a pressure relief mechanism formed in the closed bottom end of said container for releasing internal pressure from within said container when the internal pressure becomes excessive, said pressure relief mechanism including a first stress concentration groove crossing a second stress concentration groove, and a third stress concentration groove having an arcuate configuration and arranged in relation to the first and second stress concentration grooves to define a vent section.

18. The battery container as defined in claim 17, wherein said battery container further comprises a seal assembly for closing the open top end of the container.

19. The battery container as defined in claim 17 further comprising a cover positioned over the closed end and extending over said pressure relief mechanism.

20. The battery container as defined in claim 17, wherein said third stress concentration groove has a substantially semi-circular configuration.

21. The battery container as defined in claim 17, wherein said first and second stress concentration grooves are substantially orthogonal to one another.

22. The battery container as defined in claim 17 further comprises a fourth stress concentration groove having an arcuate configuration and arranged in relation to said first and second stress concentration grooves to define another vent section.

23. The battery as defined in claim 17, wherein said third stress concentration groove has a reduced thickness compared to the adjacent can bottom.

* * * * *